(12) United States Patent
Paul et al.

(10) Patent No.: US 10,679,119 B2
(45) Date of Patent: Jun. 9, 2020

(54) HANDLING SIGNAL SATURATION IN SPIKING NEURAL NETWORKS

(71) Applicant: INTEL CORPORATION, Santa Clara, CA (US)

(72) Inventors: Arnab Paul, Hillsboro, OR (US); Narayan Srinivasa, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 631 days.

(21) Appl. No.: 15/468,838

(22) Filed: Mar. 24, 2017

(65) Prior Publication Data

US 2018/0276529 A1  Sep. 27, 2018

(51) Int. Cl.
*G06N 3/04* (2006.01)

(52) U.S. Cl.
CPC .......... *G06N 3/049* (2013.01); *G06N 3/0454* (2013.01)

(58) Field of Classification Search
CPC ....... G06N 3/049; G06N 3/0454; G06N 3/082
See application file for complete search history.

(56) References Cited

U.S. PATENT DOCUMENTS

| | | | | |
|---|---|---|---|---|
| 5,719,955 A * | 2/1998 | Mita | ....... | G06N 3/063 |
| | | | | 382/158 |
| 6,185,548 B1 * | 2/2001 | Schwartz | ....... | G16H 50/20 |
| | | | | 706/21 |
| 2015/0106306 A1 * | 4/2015 | Birdwell | ....... | G06F 16/22 |
| | | | | 706/11 |
| 2015/0134582 A1 * | 5/2015 | Levin | ....... | G06N 3/04 |
| | | | | 706/25 |
| 2017/0024661 A1 * | 1/2017 | Hunsberger | ....... | G06N 3/049 |
| 2017/0213129 A1 * | 7/2017 | Lee | ....... | G06N 3/08 |
| 2018/0260696 A1 * | 9/2018 | Suda | ....... | G06N 3/04 |

OTHER PUBLICATIONS

Toby Lightheart, Steven Grainger, Tien-Fu Lu, "A constructive Spiking Neural Netowork for Reinforcement Learning in Autonomous Control", University of Adelaide, SA 5005, pp. 1-8, 2010 (Year: 2010).*

Malte Skarupke, "Neural Networks are Impressively Good at Compression", pp. 1-16, Apr. 30, 2016 (Year: 2016).*

(Continued)

*Primary Examiner* — Kakali Chaki
*Assistant Examiner* — Vasyl Dykyy
(74) *Attorney, Agent, or Firm* — Hanley, Flight & Zimmerman, LLC (57) ABSTRACT

The present disclosure provides for generating a spiking neural network. Generating a spiking neural network can include determining that a first input fan-in from a plurality of input neurons to each of a plurality of output neurons is greater than a threshold, generating a plurality of intermediate neurons based on a determination that the first input fan-in is greater than the threshold, and coupling the plurality of intermediate neurons to the plurality of input neurons and the plurality of output neurons, wherein each of the plurality of intermediate neurons has a second input fan-in that is less than the first input fan-in and each of the plurality of output neurons has a third input fan-in that is less than the first input fan-in.

18 Claims, 7 Drawing Sheets

(56) References Cited

OTHER PUBLICATIONS

D.S. Phatak and I. Korean, "Connectivity and Performance Tradeoffs in Cascade Correlation Learning Architecture", IEEE transcation on neural networks, vol. 5, No. 6, Nov. 1994, pp. 930-935 (Year: 1994).*

Gnana Sheela, S.N. Deepa, "Review on Methods to Fix Number of Hidden Neurons in Neural Networks", Hindwani, Mathmetical problems in engineerings, vol. 2015, pp. 1-12, May 2013 (Year: 2013).*

\* cited by examiner

HANDLING SIGNAL SATURATION IN SPIKING NEURAL NETWORKS

TECHNICAL FIELD

The present disclosure relates to neural networks. In particular, the present disclosure relates to spiking neural networks.

DETAILED DESCRIPTION OF PREFERRED EMBODIMENTS

In many applications it may be desirable for the output of a spiking neuron to reflect the dot product of its input and fan-in weights accurately. Implementing such a spiking neural network may be difficult as spiking neurons can become saturated in terms of the number of spikes they can produce in a unit time window.

As used herein, a spiking neuron network is a network comprised of spiking neurons and synapses. A spiking neuron can be a neuron that does not fire at every propagation cycle but rather fires only when a membrane potential reaches a specific value (e.g., threshold). A membrane potential is the difference between an electric potential between an interior and exterior of a biological cell.

In some embodiments, a spiking neuron can be implemented utilizing a software object referred to as a node. A synapse can be implemented utilizing a software object referred to as a link. The examples described herein can also be implemented utilizing a neural processor.

A recourse for dealing with saturation of spiking neurons is a feed forward inhibition network. However, a feed forward inhibition network can utilize $O(n^2)$ synapses (e.g., connections between neurons) and 2n neurons. Synaptic state maintenance can be an expensive (e.g., cost and/or time) hardware event. The alternative is to increase the number of time steps and use larger membrane time constants, but that may conflict with the precision allowed by the hardware.

In a number of embodiments described herein, a network restructuring mechanism is proposed. A number of embodiments implementing the network restructuring mechanism can combine scaling and depth to avoid the saturation effect. The network restructuring mechanism can be implemented utilizing $O(n \cdot \log n)$ neurons (e.g., nodes) and $O(n \cdot \log n)$ additional synapses (e.g., links). A quantity of synapse states, which is expensive for a hardware chip to maintain, makes the network restructuring mechanism attractive. The state of the synapse can affect transmitting of signals between associated neurons. The network restructuring mechanism allows a designer of a spiking neural network to make a trade off amongst various design constants to accomplish a task.

An original network can be restructured by introducing intermediate layers of neurons and synapses (e.g., $O(n \cdot \log n)$ neurons and/or $O(n \cdot \log n)$ synapses) such that fan-ins at an output neuron of the spiking neuron network are managed appropriately to keep the output neurons at a regime that is below saturation level of the neurons. As used herein, a saturation level can refer to a saturation of a firing rate of a neuron. A neuron saturates if the neuron receives a quantity of input spikes in a given time window that is greater than a threshold of input spikes. When saturated, the neuron fires as its membrane potential reaches a threshold (e.g., membrane potential threshold). Any further input spikes, beyond what is required to saturate a neuron, are not used in any meaningful way and the information they carry is simply dropped.

A number of additional synapses needed to restructure a network are low compared to the other known techniques, such as feed forward inhibition. A number of embodiments also describe a guiding equation used to determine how many additional neuron layers (e.g., and thus a new maximum fan-in size) are needed given other control parameters of the network. The guiding equation utilizes a plurality of parameters to obtain the required result.

One possible way to handle saturation is by normalizing the layer response. Normalizing the layer response includes summing up the collective response of a layer and then dividing every single response by this sum so that the total response is maintained at a specific level. However, this mechanism is hard to implement in hardware within the scope of a single neuron since the summing process includes collecting the responses from every element of the neuron pool. The process, therefore, cannot be implemented "locally" within the activities of a single neuron, and the neurons are mandated to communicate in a very non-local manner.

A number of embodiments described herein are completely local and introduce $O(n \log n)$ additional synapses, which is significantly better than the alternative of a feed forward inhibition technique that requires $O(n^2)$ additional synapses.

When an input fan-in of neurons is greater than a threshold, the fan-ins can be broken up by introducing additional neurons (e.g., intermediate neurons), each of which absorbs a part of the original input fan-in. As used herein, a fan-in can also be referred to as a fan-in width. A fan-in can describe a quantity of inputs that can be connected to a neuron. The additional neurons can be combined to form intermediate layers. Some or all of the additional neurons can feed into the original neurons. The quantity of intermediate layers can be selected based on how many partitions were originally made and how many maximum fan-ins are allowed.

In discussing the restructuring of a neural network, the following variables may be relevant. Let variable T represent time window over which the quantity of spikes are integrated. A variable x can define an input signal. A variable y can define an output. The variable n can represent a maximum allowed fan-in width, which can be a control variable that can be adjusted with the desired depth and the original fan-in. The variable $\tau$ can be a membrane time constant of the neurons assuming that the membrane time constant is homogeneous over the network. The variable $\Delta v$ can represent a threshold range of a membrane voltage change after which a spike is generated. The variable w is a weight matrix of a neuron. The variable $\lambda$ is a proportional constant that can be unique to an application (e.g., spiking neural network).

The output of a neuron can roughly be proportional to the dot product between fan-in weights of the neuron and the inputs of the neuron. To achieve this, an original network can be restructured by introducing auxiliary neurons and synapses. An approximate guiding equation for obtaining the structural parameters of the network is:

$$\frac{\tau \|w\|_1}{T}\left(1 - e^{-\frac{T}{\tau}}\right) = \lambda n \Delta v$$

which can be referred as equation 1 (e.g., (1)). Equation 1 can equate the product of λ, n, and Δv to the product of one minus e to the $$-\frac{T}{\tau}$$

power and τ times w to L1 magnitude divided by T.

Given network neurons, where the outputs can get saturated due to a high fan-in and/or high input spike rates, the network can be restructured so that no neuron receives a fan-in of more than n.

Restructuring the neural network can include grouping the input neurons into different groups. Each of the different groups can fan into at least a new intermediate neuron. The layer of intermediate neurons can also be divided into corresponding groups that fan in to a next layer of neurons and so on. The neural network can be restructured such that the fan-in of the output neurons is reduced as compared to the original neural network.

Equation 1 can be derived as follows. Consider a neuron with n fan-in connections and with each of the input connections having a rate k. That is, within a window of T time steps there are $$r = \frac{T}{K}$$

spikes on each input channel. Given a fixed set of connection weights, the number of total input spikes can be reflected at the output rate (e.g., the number of output spikes ~λnr).

The output response y is a non-linear function of the input neuron. For simple integrate-and-fire neurons, the differential change in the output response can be $dy \propto g(t)^T \cdot w$ for any instance of time, where g(t) is the conductance trace of its input spikes and w is the input connection weights.

On the average $$\frac{\int |g \cdot W|}{\Delta v} \approx \lambda n r.$$

Here, Δv is the range of threshold voltage that causes a spike to be generated. An exact value of the dot product μ=g·w may not be obtained; spikes can be random and thus can be a random variable. The closest estimate is to take an expectation of this random variable. The dot product of μ=g·w can be a vector of elements.

E[μ]=E[g·w]. Let $\sigma_t$ measure the average conductance trace of the input spikes then $$\sigma_t = \sum_{j=0}^{T} k e^{-\left(\frac{T-j}{\tau}\right)}$$

which means, E[g]=$\sigma_t 1^n$, where $1^n$ denotes the all one vector of length n. Therefore, ⇒E[μ]=E[$g^T w$]=$\sigma_t(1^n \cdot w)$= $\sigma_t \|w\|_1$⇒λnrΔv≈$\sigma_t \|w\|_1$, which can be referenced as equation (2) (e.g., assuming +ve weights).

$\sigma_t$=T can approximate the integral $$\sigma_T = \sum_{j=0}^{T} k e^{-\left(\frac{T-j}{\tau}\right)} = \int_0^T k e^{-\left(\frac{T-j}{\tau}\right)} dx$$

referred to as equation (3).

Evaluating the above integral in equation (3) and substituting equation (2) can lead to equation (1).

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed to imply that these operations are necessarily order dependent. In particular, these operations may not be performed in the order of presentation. Operations described may be performed in an order different from that of the described embodiment. Various additional operations may be performed and/or described. Operations may be omitted in additional embodiments.

For the purposes of the present disclosure, the phrase "A and/or B" means A, B, or A and B. For the purposes of the present disclosure, the phrase "A, B, and/or C" means A, B, C, A and B, A and C, B and C, or A, B, and C.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
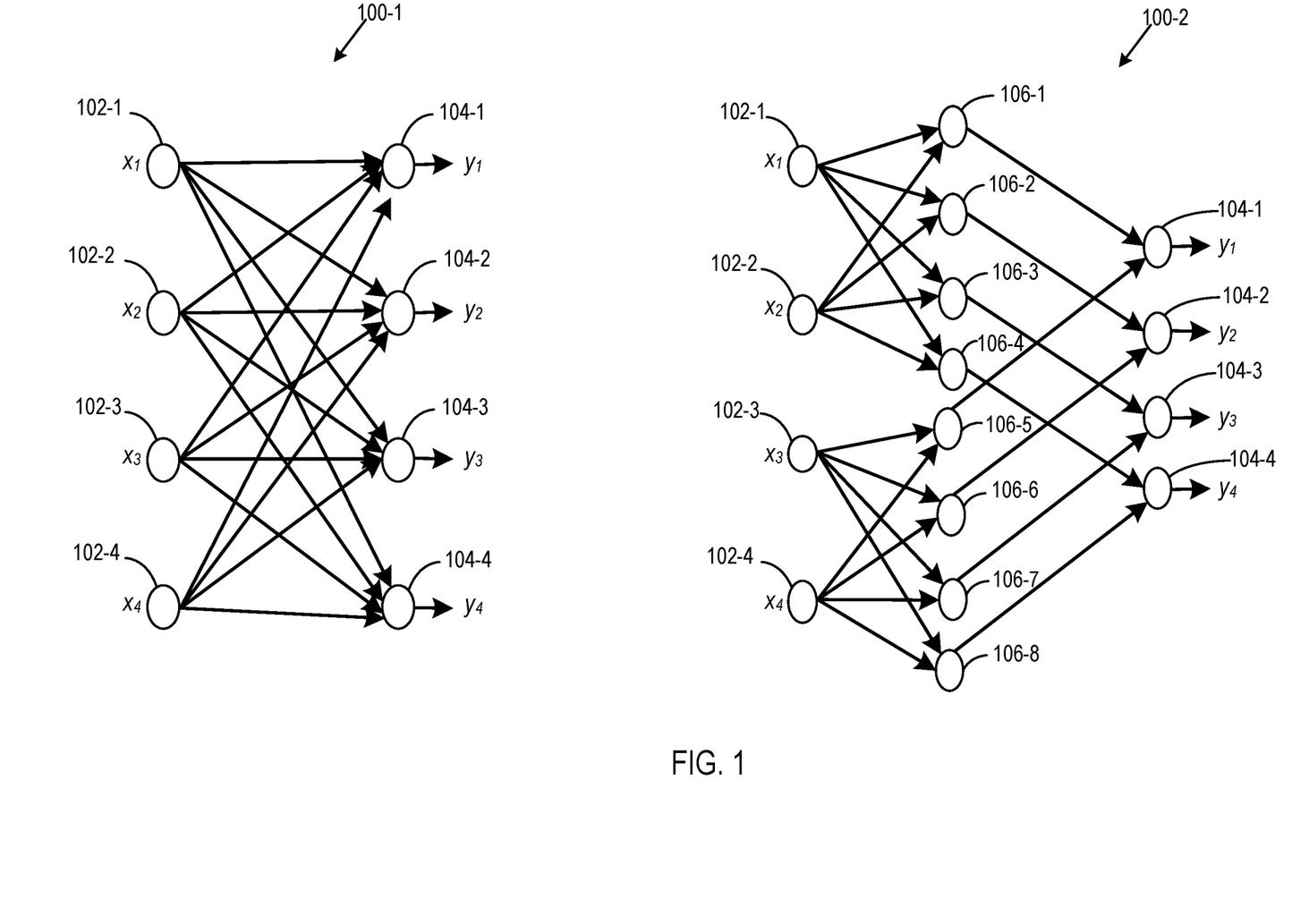
FIG. 1 is a diagram illustrating a plurality of neurons in a spiking neural network according to various embodiments.

FIG. 1 is a diagram illustrating a plurality of neurons in a spiking neural network according to various embodiments. FIG. 1 includes an original spiking neural network 100-1 and a restructured spiking neural network 100-2, referred to generally as the network 100-1 and the network 100-2, respectively.

The network 100-1 can be an original network before a network restructure mechanism is operated on the network 100-1. The network 100-2 can be the result of the network restructure mechanism. That is, the network 100-1 can be transformed into the network 100-2. In some embodiments, the network 100-2 can be generated independent of the network 100-1. That is, the network 100-2 can be an original network that is configured utilizing equation (1) without reconfiguring a different network (e.g., the network 100-1).

The network 100-1 can include input neurons 102-1, 102-2, 102-3, and 102-4, referred as input neurons 102. The network 100-1 can also output neurons 104-1, 104-2, 104-3, and 104-4, referred to as output neurons 104. In some embodiments, the input neurons 102 and/or the output neurons 104 can comprise the entire network 100-1. In other embodiments, the input neurons 102 and/or the output neurons 104 can comprise a portion of the network 100-1. That is, the entire network 100-1 can be restructured or only a portion of the network 100-1 can be restructured.

Each of the input neurons 102 can be coupled to the output neurons 104 utilizing a plurality of synapses. For example, each of the input neurons 102 can be coupled to each of the output neurons 104. In other embodiments, each of the input neurons 102 can be coupled to a portion of the output neurons 104.

In the network 100-1 each of the output neurons 104 can have four input fan-in connections. The four input fan-in connections can be greater than a threshold number of fan-in connections, which may contribute to the saturation of the output neurons 104. As such, a restructure of the network 100-1 can aim to lower the input fan-in connections to the output neurons 104 of the network 100-1.

To restructure the network 100-1, the input neurons 102 can be decoupled from the output neurons 104. An intermediate layer of intermediate neurons 106-1, 106-2, 106-3, 106-4, 106-5, 106-6, 106-7, and 106-8, referred to as intermediate neurons 106, can be added to the network 100-2. Although a single intermediate layer is provided, the network 100-1 can be reconfigured to include multiple intermediate layers.

Focusing on the network 100-2, the input neurons 102 of the network 100-2 can be the same neurons as the input neurons 102 of the network 100-1. The output neurons 104 of the network 100-2 can be the same neurons as the output neurons 104 of the network 100-1.

In restructuring the network 100-1, the input neurons 102-1 of the network 100-2 can be grouped. For example, the input neurons 102-1 and 102-2 are grouped in a first group and the input neurons 102-3 and 102-4 are grouped in a second group.

The intermediate neurons 106 can also be grouped. For example, the intermediate neurons 106-1, 106-2, 106-3, and 106-4 are grouped in a third group and the intermediate neurons 106-5, 106-6, 106-7, and 106-8 are grouped in a fourth group. The first group can correspond to the third group and the second group can correspond to the fourth group.

In some embodiments, each of the input neurons 102-1 and 102-2 in the first group can be coupled to each of the intermediate neurons 106-1, 106-2, 106-3, and 106-4 in the third group. The input neurons 102-3 and 102-4 in the second group can be coupled to each of the intermediate neurons 106-5, 106-6, 106-7, and 106-8 in the fourth group. Each of the intermediate neurons 106 can have two input fan-in connections.

Each of the intermediate neurons 106 can be coupled to corresponding neurons from the output neurons 104. For example, the intermediate neurons 106-1 and 106-5 are coupled to the output neuron 104-1. The intermediate neurons 106-2 and 106-6 are coupled to the output neuron 104-2. The intermediate neurons 106-3 and 106-7 are coupled to the output neuron 104-3. The intermediate neurons 106-4 and 106-8 are coupled to the output neuron 104-4. As such, each of the output neurons 104 can have two input fan-in connections coupling the intermediate neurons 106 to the output neurons 104. As such, the output neurons 104 in the network 100-2 can have less input fan-in connections than the output neurons 104 in the network 100-1.

In some embodiments, each of the groups of the intermediate neurons 106 can have a same quantity of neurons as the quantity of output neurons 104. Also, the input fan-in connections of the intermediate neurons 106 in the network 100-2 can be equal to the input fan-in connections of the output neurons 104 in the network 100-1. With reference to weights that may be associated with the output neurons 104 in the network 100-1, the weights may be re-implemented in the output neurons 104 of the network 100-2.

Figure 2:
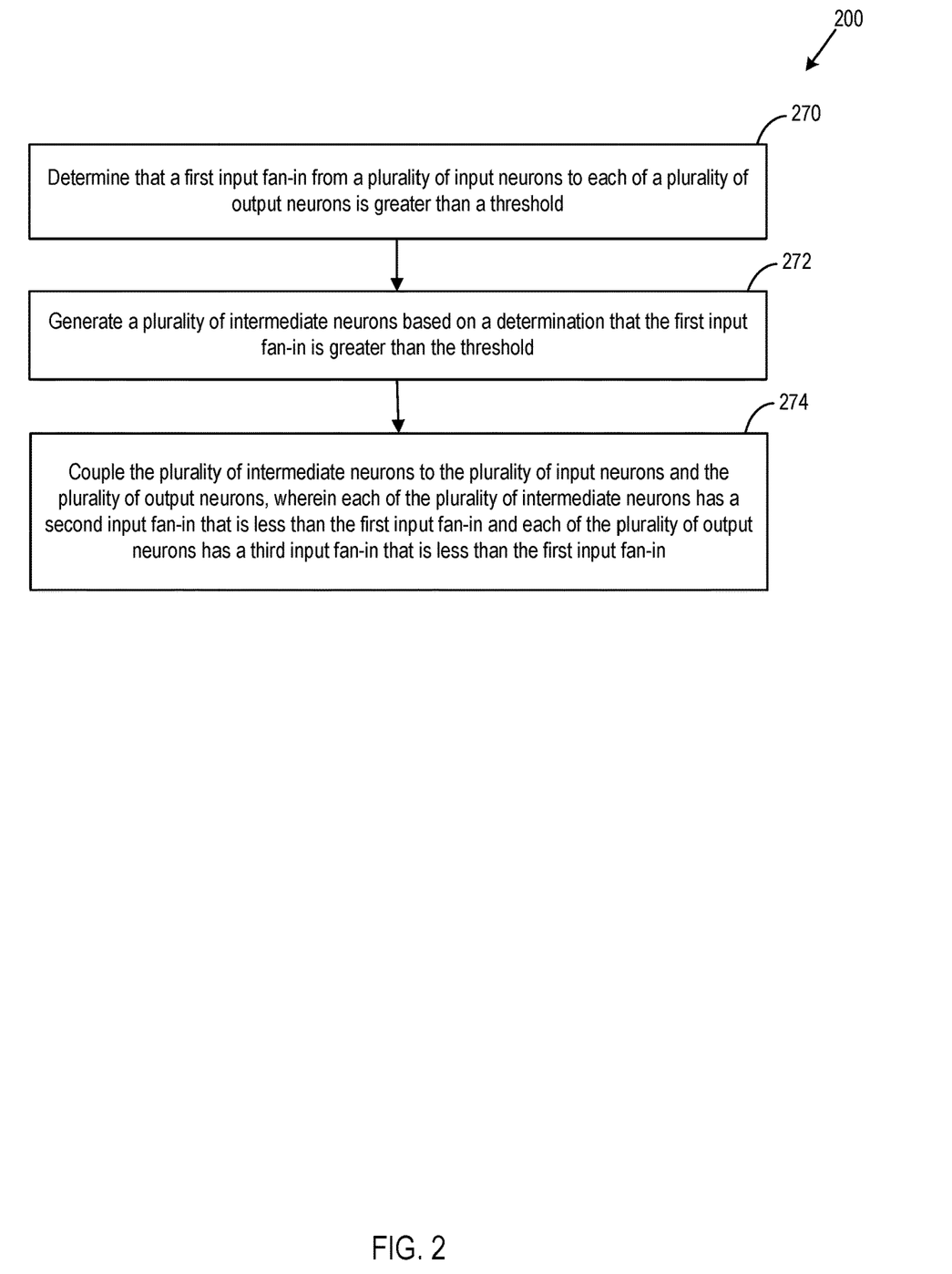
FIGS. 2, 3, 4, and 5 are flow diagrams illustrating methods for handling signal saturation in spiking neural networks according to various embodiments.

FIG. 2 is a flow diagram illustrating a method 200 for handling signal saturation in spiking neural networks according to various embodiments. The method 200 comprises determining 270 that a first input fan-in from a plurality of input neurons to each of a plurality of output neurons is greater than a threshold, generating 272 a plurality of intermediate neurons based on a determination that the first input fan-in is greater than the threshold, and coupling 274 the plurality of intermediate neurons to the plurality of input neurons and the plurality of output neurons, wherein each of the plurality of intermediate neurons has a second input fan-in that is less than the first input fan-in and each of the plurality of output neurons has a third input fan-in that is less than the first input fan-in.

In some embodiments, the method 200 can be implemented via a neural processor. Coupling the plurality of intermediate neurons to the plurality of input neurons and the plurality of output neurons can further comprise coupling the plurality of intermediate neurons such that the sum of the second input fan-in and the third input fan-in is equal to the first input fan-in. Coupling the plurality of intermediate neurons to the plurality of input neurons and the plurality of output neurons can further comprise coupling the plurality of intermediate neurons such that the second input fan-in is less than the threshold.

Coupling the plurality of intermediate neurons to the plurality of input neurons and the plurality of output neurons further comprises coupling the plurality of intermediate neurons such that the third input fan-in is less than the threshold, wherein the threshold can represent a saturation point of the plurality of output neurons and wherein the saturation point can be based on a fan-in of the plurality of output neurons and a plurality of input spike rate of the plurality of output neurons.

Figure 3:
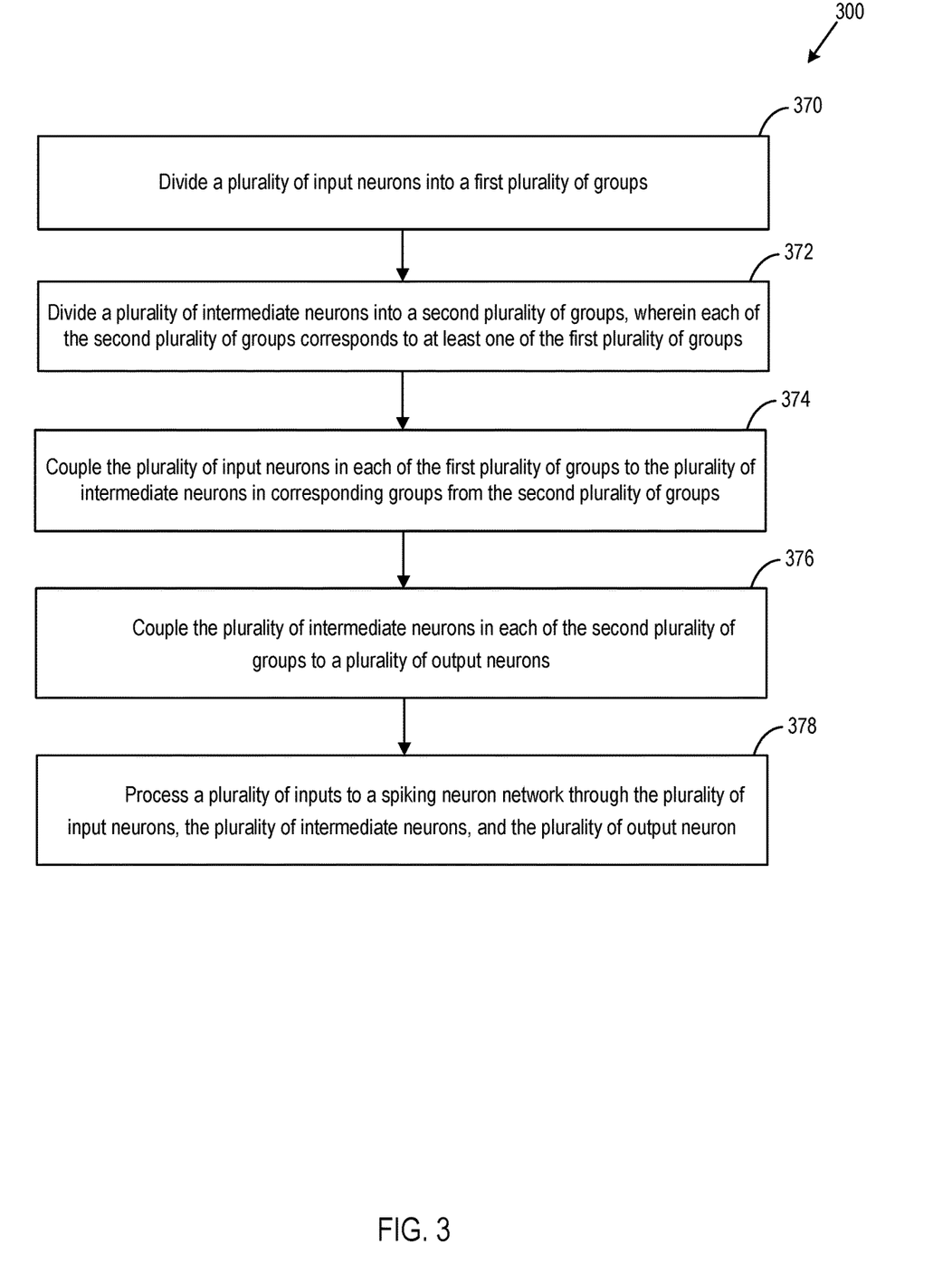

FIG. 3 is a flow diagram illustrating a method 300 for handling signal saturation in spiking neural networks according to various embodiments. The method 300 includes dividing 370 a plurality of input neurons into a first plurality of groups, dividing 372 a plurality of intermediate neurons into a second plurality of groups, wherein each of the second plurality of groups corresponds to at least one of the first plurality of groups, coupling 374 the plurality of input neurons in each of the first plurality of groups to the plurality of intermediate neurons in corresponding groups from the second plurality of groups, coupling 376 the plurality of intermediate neurons in each of the second plurality of groups to a plurality of output neurons, and processing 378 a plurality of inputs to a spiking neuron network through the plurality of input neurons, the plurality of intermediate neurons, and the plurality of output neurons.

Generating the plurality of intermediate neurons divided into the second plurality of groups can further comprise assigning each of the plurality of intermediate neurons to a different one of the second plurality of groups. A quantity of neurons in each of the second plurality of groups can be equal to a quantity of the plurality of output neurons. A quantity of neurons in each of the second plurality of groups can be less than a quantity of the plurality of output neurons.

Dividing the plurality of input neurons into the first plurality of groups can further comprise assigning each of the plurality of input neurons to a different one first plurality of groups. A quantity of neurons in each of the first plurality of groups can be less than a quantity of the plurality of intermediate neurons. A quantity of neurons in each of the first plurality of groups can be half a quantity of the plurality of intermediate neurons.

Figure 4:
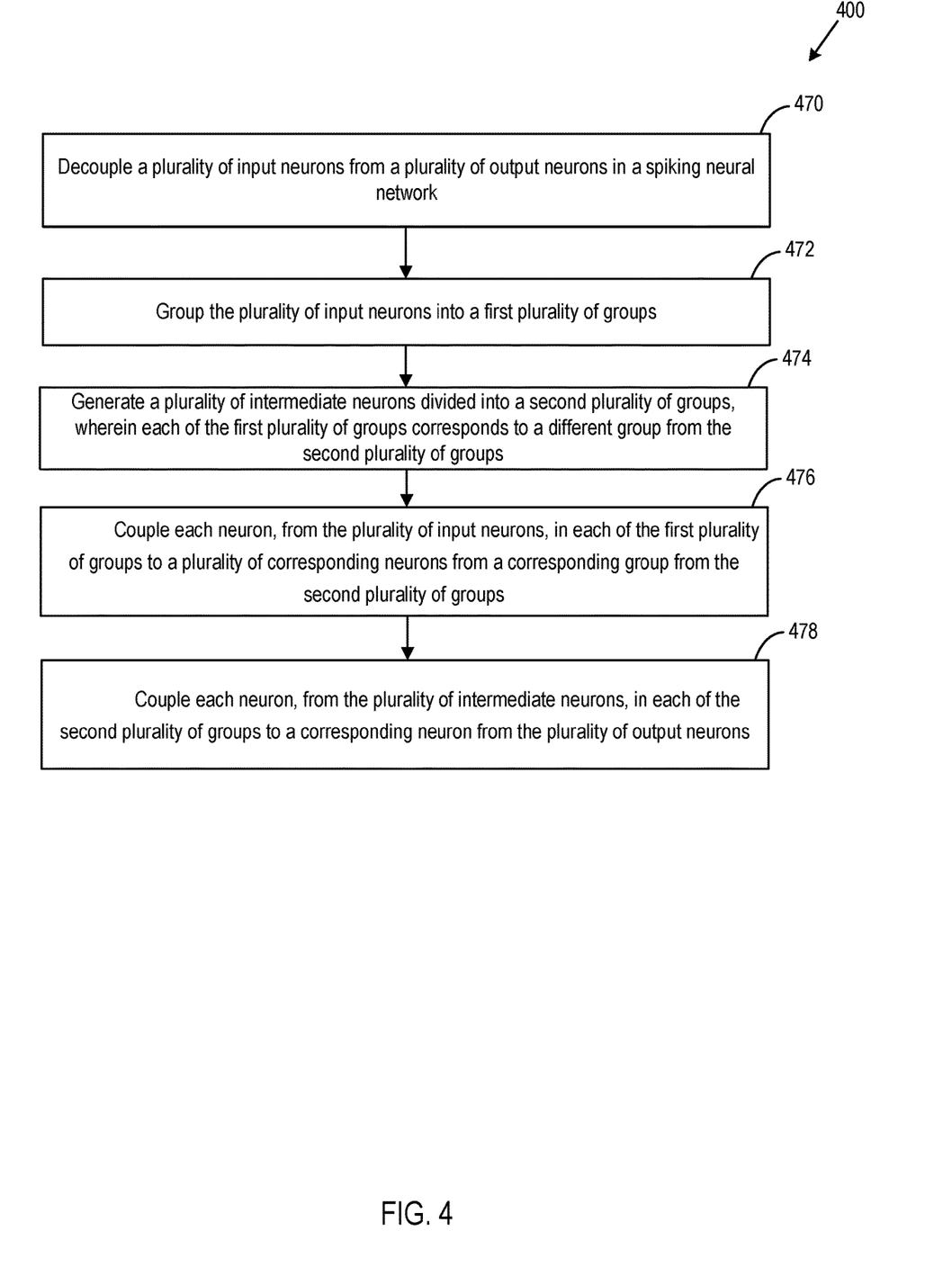

FIG. 4 is a flow diagram illustrating a method 400 for handling signal saturation in spiking neural networks according to various embodiments. The method 400 comprises decoupling 470 a plurality of input neurons from a plurality of output neurons in a spiking neural network, grouping 472 the plurality of input neurons into a first plurality of groups, generating 474 a plurality of intermediate neurons divided into a second plurality of groups, wherein each of the first plurality of groups corresponds to a different group from the second plurality of groups, coupling 476 each neuron, from the plurality of input neurons, in each of the first plurality of groups to a plurality of corresponding neurons from a corresponding group from the second plurality of groups, and coupling 478 each neuron, from the plurality of intermediate neurons, in each of the second plurality of groups to a corresponding neuron from the plurality of output neurons.

Generating the plurality of intermediate neurons divided into the second plurality of groups can further comprise determining a quantity of the plurality of intermediate neurons based on a membrane time constant of neurons, the plurality of intermediate neurons, the number of layers of the intermediate neurons, and the plurality of output neurons. Generating the plurality of intermediate neurons divided into the second plurality of groups can further comprise determining a quantity of the plurality of intermediate neurons based on the threshold voltage for neurons to produce spikes, the plurality of intermediate neurons, and the plurality of output neurons.

Generating the plurality of intermediate neurons divided into the second plurality of groups can further comprise determining a quantity of the plurality of intermediate neurons based on a maximum allowed fan-in width of the plurality of output neurons. Generating the plurality of intermediate neurons divided into the second plurality of groups can further comprise determining a quantity of the plurality of intermediate neurons based on a weight matrix associated with the plurality of intermediate neurons. Generating the plurality of intermediate neurons divided into the second plurality of groups can further comprise determining a quantity of the plurality of intermediate neurons based on a threshold range of a membrane voltage change after which a spike is generated in the plurality of output neurons. An output of the plurality of output neurons can be proportional to a dot product of a fan-in weight of the plurality of output neurons and an input to the plurality of output neurons. An output of the plurality of output neurons can be within a threshold of a dot product of a fan-in weight of the plurality of output neurons and an input to the plurality of output neurons.

Figure 5:
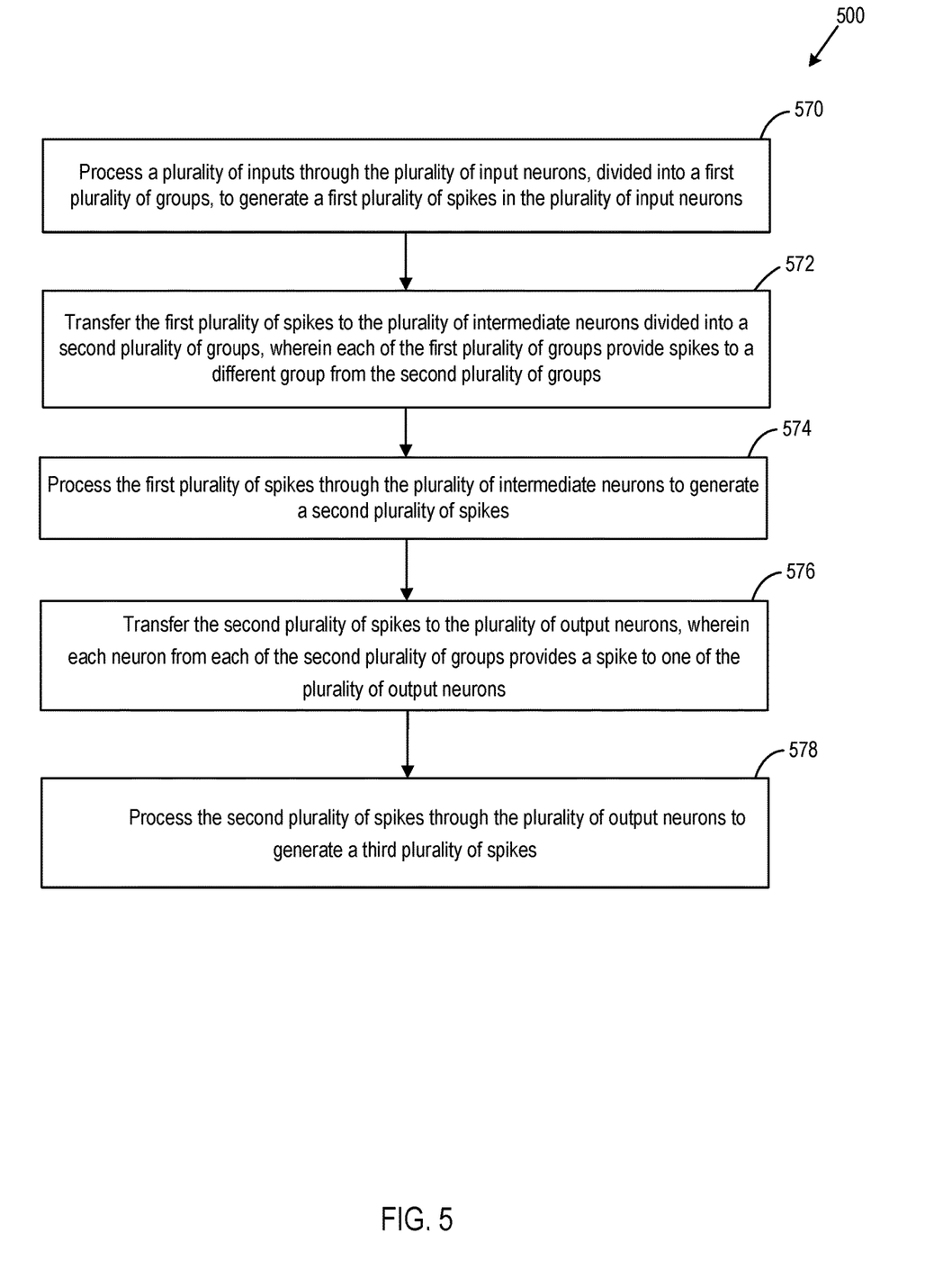

FIG. 5 is a flow diagram illustrating a method 500 for handling signal saturation in spiking neural networks according to various embodiments. The method 500 comprises processing 570 a plurality of inputs through the plurality of input neurons, divided into a first plurality of groups, to generate a first plurality of spikes in the plurality of input neurons and transferring 572 the first plurality of spikes to the plurality of intermediate neurons divided into a second plurality of groups, wherein each of the first plurality of groups provides spikes to a different group from the second plurality of groups. The method 500 also comprises processing 574 the first plurality of spikes through the plurality of intermediate neurons to generate a second plurality of spikes, transferring 576 the second plurality of spikes to the plurality of output neurons, wherein each neuron from each of the second plurality of groups provides a spike to one of the plurality of output neurons, and processing 578 the second plurality of spikes through the plurality of output neurons to generate a third plurality of spikes.

The plurality of input neurons comprise a first layer of the spiking neural network, the plurality of intermediate neurons comprise a second layer of the spiking neural network, and the plurality of output neurons comprise a third layer of the spiking neural network. In this example, a quantity of neurons in each of the second plurality of groups is equal to a quantity of neurons in the plurality of output neurons.

The first plurality of spikes can be less than the second plurality of spikes, and the second plurality of spikes can be less than the third plurality of spikes. In some examples, the rate at which the first plurality of spikes are generated can be greater than the rate at which the second plurality of spikes are generated. The rate at which the third plurality of spikes are generated can be less than the rate at which the second plurality of spikes are generated.

In some examples, the first plurality of groups can comprise two groups and the second plurality of groups can also comprise two groups. Each of the first plurality of groups can include two neurons. Each of the second plurality of groups can include four neurons.

Neurons in the first group from the first plurality of groups can provide spikes to neurons in the first group from the second plurality of groups. Neurons in the second group from the second plurality of groups can provide spikes to the output neurons.

Figure 6:
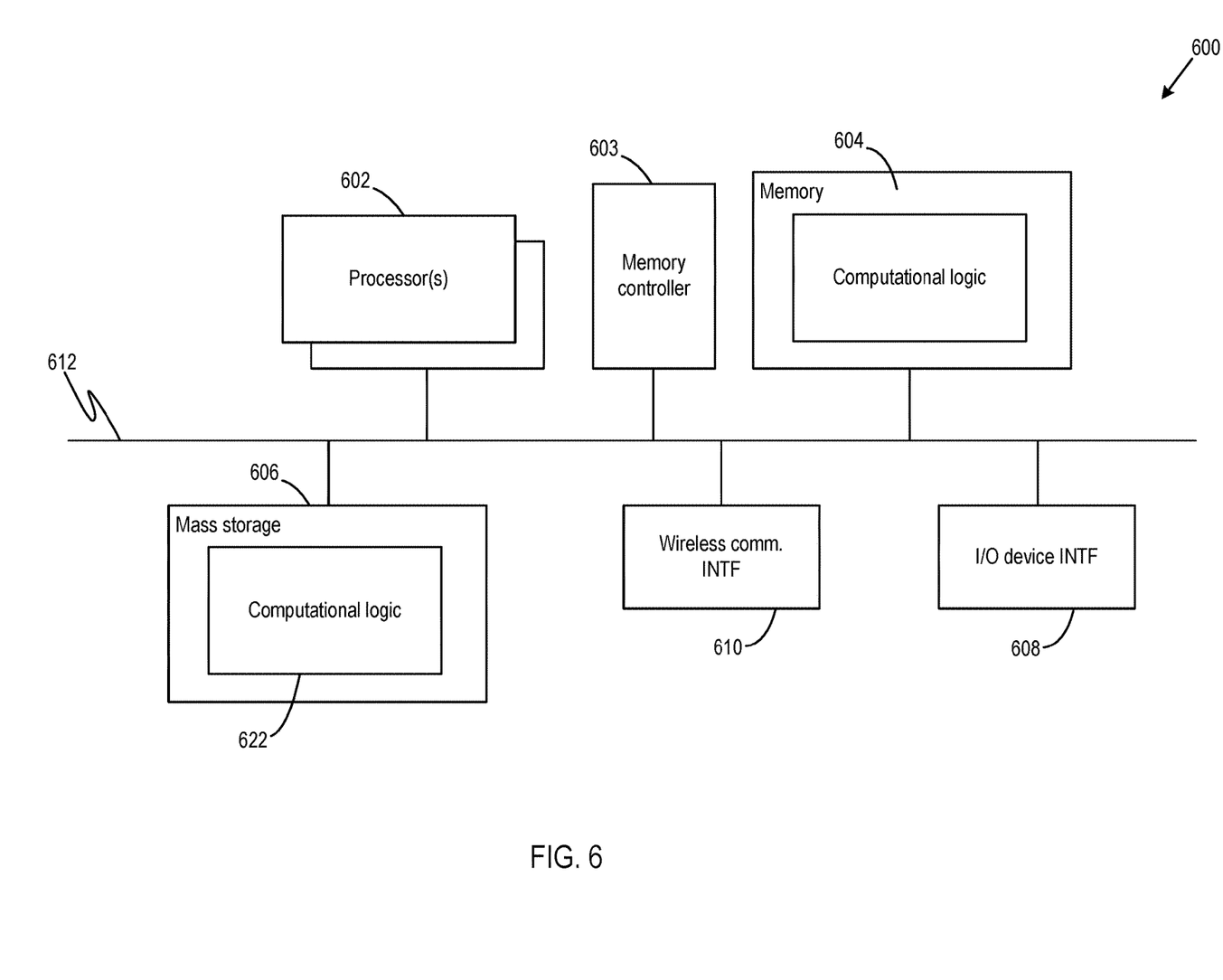
FIG. 6 is a block diagram illustrating an example computing device suitable for use to practice aspects of the present disclosure, according to various embodiments.

FIG. 6 illustrates an example of a computing device 600 suitable for use to practice aspects of the present disclosure, according to various embodiments. As shown, the computing device 600 may include one or more processors 602, each with one or more processor cores, a system memory 604, and a memory controller 603. The system memory 604 may be any volatile or non-volatile memory. Additionally, the computing device 600 may include mass storage devices 606. Example of the mass storage devices 606 may include, but are not limited to, tape drives, hard drives, compact disc read-only memory (CD-ROM), and so forth. Further, the computing device 600 may include input/output devices 608 (such as display, keyboard, cursor control, and so forth) and communication interfaces 610 (such as wireless and/or wired communication/network interface cards, modems, and so forth). The elements may be coupled to each other via a system bus 612, which may represent one or more buses. In the case of multiple buses, they may be bridged by one or more bus bridges (not shown).

The system memory 604 and the mass storage devices 606 may be employed to store a working copy and a permanent copy of the programming instructions implementing a number of operations referred to as computational logic 622. The memory controller 603 may include internal memory to store a working copy and a permanent copy of the programming instructions implementing a number of operations associated with restructuring a spiking neural network. The computational logic 622 may be implemented by assembler instructions supported by the processor(s) 602 or high-level languages, such as, for example, C, that can be compiled into such instructions.

The number, capability, and/or capacity of the elements 610 and 612 may vary, depending on whether the computing device 600 is used as a mobile device, such as a wearable device, a smartphone, a computer tablet, a laptop, and so forth, or a stationary device, such as a desktop computer, a server, a game console, a set-top box, an infotainment console, and so forth. Otherwise, the constitutions of the elements 610 and 612 are known, and accordingly will not be further described.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module," or "system." Furthermore, the present disclosure may take the form of a computer program product embodied in any tangible or non-transitory medium of expression having computer-usable program code embodied in the medium.

Figure 7:
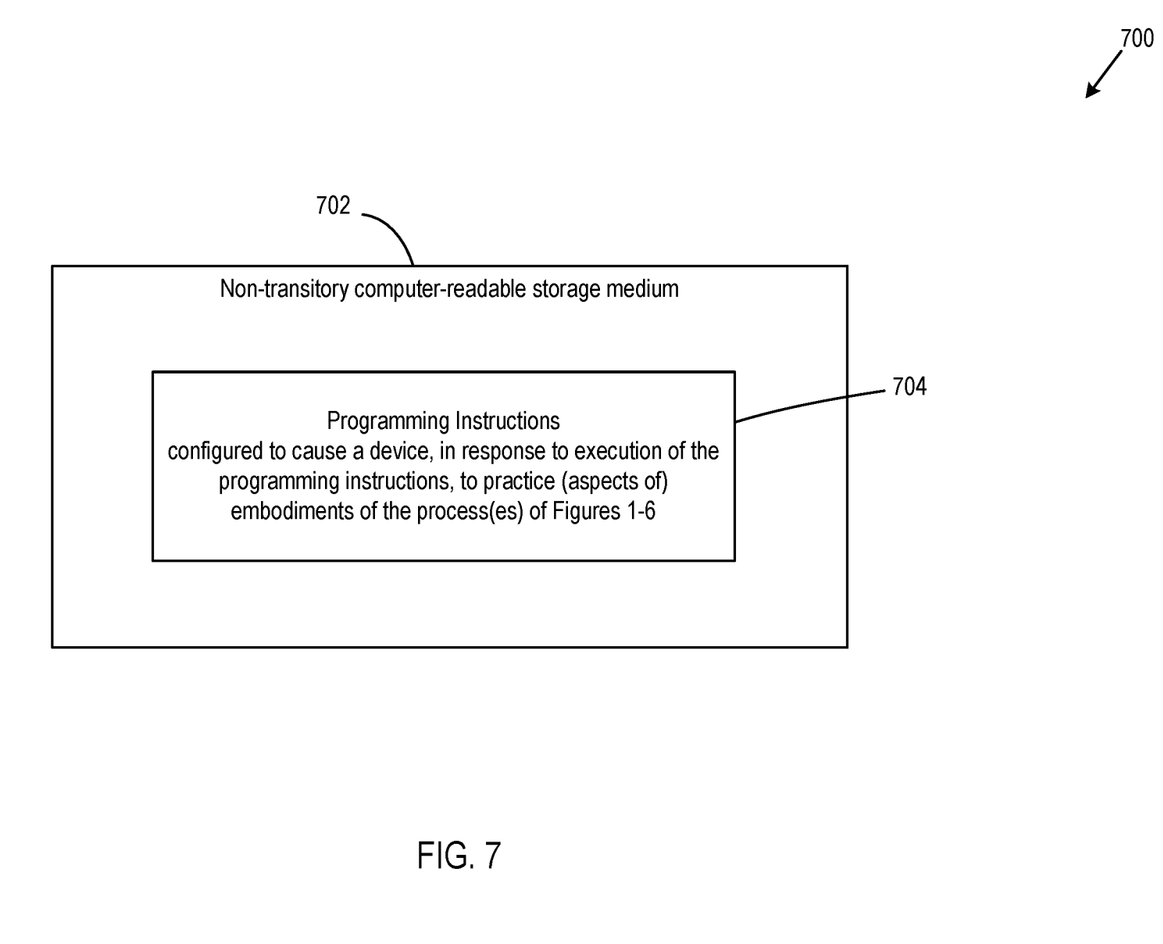
FIG. 7 is a block diagram illustrating a storage medium having instructions for practicing methods described with references to FIGS. 1-6, according to various embodiments.

FIG. 7 illustrates an example non-transitory computer-readable storage medium that may be suitable for use to store instructions that cause an apparatus, in response to execution of the instructions by the apparatus, to practice selected aspects of the present disclosure. As shown, a non-transitory computer-readable storage medium 702 may include a number of programming instructions 704. The programming instructions 704 may be configured to enable a device (e.g., the computing device 600 in FIG. 6) in response to execution of the programming instructions 704, to implement (aspects of) the restructured network 100-1 in FIG. 1, as earlier described. In alternative embodiments, the programming instructions 704 may be disposed on the multiple non-transitory computer-readable storage media 702 instead. In still other embodiments, the programming instructions 704 may be disposed on the multiple non-transitory computer-readable storage media 702, such as signals.

Any combination of one or more computer-usable or computer-readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer; partly on the user's computer, as a stand-alone software package; partly on the user's computer and partly on a remote computer; or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an," and "the" are intended to include plural forms as well, unless the context clearly indicates otherwise. It will be further understood that the terms "comprises" and/or "comprising," when used in this specification, are specific to the presence of stated features, integers, steps, operations, elements, and/or components, but do not preclude the presence or addition of one or more other features, integers, steps, operation, elements, components, and/or groups thereof.

Embodiments may be implemented as a computer process, a computing system, or an article of manufacture such as a computer program product of computer-readable media. The computer program product may be a computer storage medium readable by a computer system and encoding computer program instructions for executing a computer process.

The corresponding structures, material, acts, and equivalents of all means or steps plus function elements in the claims below are intended to include any structure, material, or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Referring back to FIG. 6, for one embodiment, at least one of the processors 602 may be packaged together with memory, as earlier described. For one embodiment, at least one of the processors 602 may be packaged together with memory, to form a System in Package (SiP). For one embodiment, at least one of the processors 602 may be integrated on the same die with memory. For one embodiment, at least one of the processors 602 may be packaged together with memory, to form an SoC. For at least one embodiment, the SoC may be utilized in, but not limited to, a wearable device, a smartphone or a computing tablet. Thus various example embodiments of the present disclosure have been described including, but are not limited to:

Example 1 is an apparatus of a device to generate a spiking neural network. The device includes electronic memory to store a variety of input neurons and a variety of output neurons of a spiking neural network. The device includes one or more processors designed to determine that a first input fan-in from the variety of input neurons to each of the variety of output neurons is greater than a threshold, and generate a variety of intermediate neurons based on a determination that the first input fan-in is greater than the threshold. The device includes one or more processors designed to attach the variety of intermediate neurons to the variety of input neurons and the variety of output neurons, where each of the variety of intermediate neurons has a second input fan-in that is less than the first input fan-in, and each of the variety of output neurons has a third input fan-in that is less than the first input fan-in.

Example 2 is the apparatus of Example 1, where the electronic memory is part of a neural processor.

Example 3 is the apparatus of Example 1, where the one or more processors designed to attach the variety of intermediate neurons to the variety of input neurons and the variety of output neurons are further designed to attach the variety of intermediate neurons such that the sum of the second input fan-in and the third input fan-in is equal to the first input fan-in.

Example 4 is the apparatus of Example 1, where the one or more processors designed to attach the variety of intermediate neurons to the variety of input neurons and the variety of output neurons are further designed to attach the variety of intermediate neurons such that the second input fan-in is less than the threshold.

Example 5 is the apparatus of Example 1, where the one or more processors designed to attach the variety of intermediate neurons to the variety of input neurons and the variety of output neurons are further designed to attach the variety of intermediate neurons such that the third input fan-in is less than the threshold.

Example 6 is the apparatus of Example 1, where the threshold represents a saturation point of the variety of output neurons and where the saturation point is based on a fan-in of the variety of output neurons and a variety of input spike rate of the variety of output neurons.

Example 7 is a computer-readable storage medium. The computer-readable storage medium having stored thereon instructions that, when implemented by a computing device, cause the computing device to divide a variety of input neurons into a first variety of groups and divide a variety of intermediate neurons into a second variety of groups, where each of the second variety of groups corresponds to at least one of the first variety of groups. The computer-readable storage medium having stored thereon instructions that, when implemented by a computing device, cause the computing device to attach the variety of input neurons in each of the first variety of groups to the variety of intermediate neurons in corresponding groups from the second variety of groups and attach the variety of intermediate neurons in each of the second variety of groups to a variety of output neurons. The computer-readable storage medium having stored thereon instructions that, when implemented by a computing device, cause the computing device to process a variety of inputs to a spiking neuron network through the variety of input neurons, the variety of intermediate neurons, and the variety of output neurons.

Example 8 is the computer-readable storage medium of Example 7, where the instructions to generate the variety of intermediate neurons divided into the second variety of groups further include instructions to assign each of the variety of intermediate neurons to a different one of the second variety of groups.

Example 9 is the computer-readable storage medium of Example 8, where a quantity of neurons in each of the second variety of groups is equal to a quantity of the variety of output neurons.

Example 10 is the computer-readable storage medium of Example 8, where a quantity of neurons in each of the second variety of groups is less than a quantity of the variety of output neurons.

Example 11 is the computer-readable storage medium of Example 7, where the instructions to divide the variety of input neurons into the first variety of groups further include instructions to assign each of the variety of input neurons to a different one first variety of groups.

Example 12 is the computer-readable storage medium of Example 11, where a quantity of neurons in each of the first variety of groups is less than a quantity of the variety of intermediate neurons.

Example 13 is the computer-readable storage medium of Example 11, where a quantity of neurons in each of the first variety of groups is half a quantity of the variety of intermediate neurons.

Example 14 is a method for generating a spiking neural network. The method includes decoupling a variety of input neurons from a variety of output neurons in a spiking neural network, grouping the variety of input neurons into a first variety of groups, and generating a variety of intermediate neurons divided into a second variety of groups, where each of the first variety of groups corresponds to a different group from the second variety of groups. The method includes attaching each neuron, from the variety of input neurons, in each of the first variety of groups to a variety of corresponding neurons from a corresponding group from the second variety of groups, and attaching each neuron, from the variety of intermediate neurons, in each of the second variety of groups to a corresponding neuron from the variety of output neurons.

Example 15 is the method of Example 14, where generating the variety of intermediate neurons divided into the second variety of groups further includes determining a quantity of the variety of intermediate neurons based on a membrane time-constant of neurons, the variety of intermediate neurons, the number of layers of the intermediate neurons, and the variety of output neurons.

Example 16 is the method of Example 14, where generating the variety of intermediate neurons divided into the second variety of groups further includes determining a quantity of the variety of intermediate neurons based on the threshold voltage for neurons to produce spikes, the variety of intermediate neurons, and the variety of output neurons.

Example 17 is the method of Example 14, where generating the variety of intermediate neurons divided into the second variety of groups further includes determining a quantity of the variety of intermediate neurons based on a maximum allowed fan-in width of the variety of output neurons.

Example 18 is the method of Example 14, where generating the variety of intermediate neurons divided into the second variety of groups further includes determining a quantity of the variety of intermediate neurons based on a weight matrix associated with the variety of intermediate neurons.

Example 19 is the method of Example 14, where generating the variety of intermediate neurons divided into the second variety of groups further includes determining a quantity of the variety of intermediate neurons based on a threshold range of a membrane voltage change after which a spike is generated in the variety of output neurons.

Example 20 is the method of Example 14, where an output of the variety of output neurons is proportional to a dot product of a fan-in weight of the variety of output neurons and an input to the variety of output neurons.

Example 21 is the method of Example 14, where an output of the variety of output neurons is within a threshold of a dot product of a fan-in weight of the variety of output neurons and an input to the variety of output neurons.

Example 22 is an apparatus of a device to process data through a spiking neural network. The apparatus includes electronic memory to store a variety of input neurons, a variety of intermediate neurons, and a variety of output neurons of a spiking neural network. The apparatus includes one or more processors designed to process a variety of inputs through the variety of input neurons, divided into a first variety of groups, to generate a first variety of spikes in the variety of input neurons and transfer the first variety of spikes to the variety of intermediate neurons divided into a second variety of groups, where each of the first variety of groups provides spikes to a different group from the second variety of groups. The apparatus includes one or more processors designed to process the first variety of spikes through the variety of intermediate neurons to generate a second variety of spikes, transfer the second variety of spikes to the variety of output neurons, where each neuron from each of the second variety of groups provides a spike to one of the variety of output neurons, and process the second variety of spikes through the variety of output neurons to generate a third variety of spikes.

Example 23 is the apparatus of Example 22, where the variety of input neurons includes a first layer of the spiking neural network, the variety of intermediate neurons include a second layer of the spiking neural network, and the variety of outputs include a third layer of the spiking neural network.

Example 24 is the apparatus of Example 22, where a quantity of neurons in each of the second variety of groups is equal to a quantity of neurons in the variety of output neurons.

Example 25 is the apparatus of Example 22, where the first variety of spikes is less than the second variety of spikes and the second variety of spikes is less than the third variety of spikes.

Example 26 is a method to generate a spiking neural network. The method includes determining that a first input fan-in from a variety of input neurons of a spiking neural network to each of a variety of output neurons of the spiking neural network is greater than a threshold and generating a variety of intermediate neurons based on a determination that the first input fan-in is greater than the threshold. The method includes attaching the variety of intermediate neurons to the variety of input neurons and the variety of output neurons, where each of the variety of intermediate neurons has a second input fan-in that is less than the first input fan-in, and each of the variety of output neurons has a third input fan-in that is less than the first input fan-in.

Example 27 is the method of Example 26, where the electronic memory is part of a neural processor.

Example 28 is the method of Example 26, where attaching the variety of intermediate neurons to the variety of input neurons and the variety of output neurons further includes attaching the variety of intermediate neurons such that the sum of the second input fan-in and the third input fan-in is equal to the first input fan-in.

Example 29 is the method of Example 26, where attaching the variety of intermediate neurons to the variety of input neurons and the variety of output neurons further includes attaching the variety of intermediate neurons such that the second input fan-in is less than the threshold.

Example 30 is the method of Example 26, where attaching the variety of intermediate neurons to the variety of input neurons and the variety of output neurons further includes attaching the variety of intermediate neurons such that the third input fan-in is less than the threshold.

Example 31 is the method of Example 26, where the threshold represents a saturation point of the variety of output neurons and where the saturation point is based on a fan-in of the variety of output neurons and a variety of input spike rate of the variety of output neurons.

Example 32 is a method. The method includes dividing a variety of input neurons into a first variety of groups, dividing a variety of intermediate neurons into a second variety of groups, where each of the second variety of groups corresponds to at least one of the first variety of groups, and attaching the variety of input neurons in each of the first variety of groups to the variety of intermediate neurons in corresponding groups from the second variety of groups. The method includes attaching the variety of intermediate neurons in each of the second variety of groups to a variety of output neurons and processing a variety of inputs to a spiking neuron network through the variety of input neurons, the variety of intermediate neurons, and the variety of output neurons.

Example 33 is the method of Example 32, where the instructions to generate the variety of intermediate neurons divided into the second variety of groups further include instructions to assign each of the variety of intermediate neurons to a different one of the second variety of groups.

Example 34 is the method of Example 33, where a quantity of neurons in each of the second variety of groups is equal to a quantity of the variety of output neurons.

Example 35 is the method of Example 33, where a quantity of neurons in each of the second variety of groups is less than a quantity of the variety of output neurons.

Example 36 is the method of Example 32, where the instructions to divide the variety of input neurons into the first variety of groups further include instructions to assign each of the variety of input neurons to a different one first variety of groups.

Example 37 is the method of Example 36, where a quantity of neurons in each of the first variety of groups is less than a quantity of the variety of intermediate neurons.

Example 38 is the method of Example 36, where a quantity of neurons in each of the first variety of groups is half a quantity of the variety of intermediate neurons.

Example 39 is a method. The method includes processing a variety of inputs through a variety of input neurons, divided into a first variety of groups, to generate a first variety of spikes in the variety of input neurons and transferring the first variety of spikes to a variety of intermediate neurons divided into a second variety of groups, where each of the first variety of groups provides spikes to a different group from the second variety of groups. The method includes processing the first variety of spikes through the variety of intermediate neurons to generate a second variety of spikes, and transferring the second variety of spikes to a variety of output neurons, where each neuron from each of the second variety of groups provides a spike to one of the variety of output neurons. The method includes processing the second variety of spikes through the variety of output neurons to generate a third variety of spikes.

Example 40 is the method of Example 39, where the variety of input neurons includes a first layer of the spiking neural network, the variety of intermediate neurons include a second layer of the spiking neural network, and the variety of outputs include a third layer of the spiking neural network.

Example 41 is the method of Example 39, where a quantity of neurons in each of the second variety of groups is equal to a quantity of neurons in the variety of output neurons.

Example 42 is the method of Example 39, where the first variety of spikes is less than the second variety of spikes and the second variety of spikes is less than the third variety of spikes.

Example 43 is an apparatus including manner to perform a method as exemplified in any of Examples 14-21 and 26-42.

Example 44 is a manner for performing a method as exemplified in any of Examples 14-21 and 26-42.

As used herein, the term "module" may refer to, be part of, or include an application specific integrated circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

It will be obvious to those having skill in the art that many changes may be made to the details of the above-described embodiments without departing from the underlying principles of the invention. The scope of the present invention should, therefore, be determined only by the following claims.

The invention claimed is:

1. An apparatus of a device to generate a spiking neural network, comprising:
   electronic memory to store a plurality of input neurons and a plurality of output neurons of a spiking neural network;
   one or more processors configured to:
      determine that a first input fan-in from the plurality of input neurons to each of the plurality of output neurons is greater than a threshold;
      generate a plurality of intermediate neurons based on a determination that the first input fan-in is greater than the threshold; and
      couple the plurality of intermediate neurons to the plurality of input neurons and the plurality of output neurons, wherein:
         each of the plurality of intermediate neurons has a second input fan-in that is less than the first input fan-in;
         each of the plurality of output neurons has a third input fan-in that is less than the first input fan-in; and
         the plurality of intermediate neurons are coupled such that at least one of the second input fan-in and the third input fan-in is less than the threshold.

2. The apparatus of claim 1, wherein the electronic memory is part of a neural processor.

3. The apparatus of claim 1, wherein the one or more processors configured to couple the plurality of intermediate neurons to the plurality of input neurons and the plurality of output neurons are further configured to couple the plurality of intermediate neurons such that the sum of the second input fan-in and the third input fan-in is equal to the first input fan-in.

4. The apparatus of claim 1, wherein the threshold represents a saturation point of the plurality of output neurons and wherein the saturation point is based on a fan-in of the plurality of output neurons and a plurality of input spike rate of the plurality of output neurons.

5. A non-transitory computer-readable storage medium having stored thereon instructions that, when implemented by a computing device, cause the computing device to:
   divide a plurality of input neurons into a first plurality of groups;
   divide a plurality of intermediate neurons into a second plurality of groups, wherein each of the second plurality of groups corresponds to at least one of the first plurality of groups, wherein to divide the plurality of intermediate neurons into the second plurality of groups comprises to determine a quantity of the plurality of intermediate neurons based on a membrane time-constant of neurons, the plurality of intermediate neurons, a number of layers of the intermediate neurons, and a plurality of output neurons;
   couple the plurality of input neurons in each of the first plurality of groups to the plurality of intermediate neurons in corresponding groups from the second plurality of groups;
   couple the plurality of intermediate neurons in each of the second plurality of groups to the plurality of output neurons; and
   process a plurality of inputs to a spiking neuron network through the plurality of input neurons, the plurality of intermediate neurons, and the plurality of output neurons.

6. The non-transitory computer-readable storage medium of claim 5, wherein the instructions to divide the plurality of intermediate neurons into the second plurality of groups further comprise instructions to assign each of the plurality of intermediate neurons to a different one of the second plurality of groups.

7. The non-transitory computer-readable storage medium of claim 6, wherein a quantity of neurons in each of the second plurality of groups is equal to a quantity of the plurality of output neurons.

8. The non-transitory computer-readable storage medium of claim 6, wherein a quantity of neurons in each of the second plurality of groups is less than a quantity of the plurality of output neurons.

9. The non-transitory computer-readable storage medium of claim 5, wherein the instructions to divide the plurality of input neurons into the first plurality of groups further comprise instructions to assign each of the plurality of input neurons to a different one first plurality of groups.

10. The non-transitory computer-readable storage medium of claim 9, wherein a quantity of neurons in each of the first plurality of groups is less than a quantity of the plurality of intermediate neurons.

11. The non-transitory computer-readable storage medium of claim 9, wherein a quantity of neurons in each of the first plurality of groups is half a quantity of the plurality of intermediate neurons.

12. A method for generating a spiking neural network, comprising:
   decoupling a plurality of input neurons from a plurality of output neurons in a spiking neural network;
   grouping the plurality of input neurons into a first plurality of groups;
   generating a plurality of intermediate neurons divided into a second plurality of groups, wherein each of the first plurality of groups corresponds to a different group from the second plurality of groups, wherein generating the plurality of intermediate neurons comprises determining a quantity of the plurality of intermediate neurons based on a membrane time-constant of neurons, the plurality of intermediate neurons, a number of layers of the intermediate neurons, and the plurality of output neurons;
   coupling each neuron, from the plurality of input neurons, in each of the first plurality of groups to a plurality of corresponding neurons from a corresponding group from the second plurality of groups; and
   coupling each neuron, from the plurality of intermediate neurons, in each of the second plurality of groups to a corresponding neuron from the plurality of output neurons.

13. The method of claim 12, wherein generating the plurality of intermediate neurons divided into the second plurality of groups further comprises determining a quantity of the plurality of intermediate neurons based on a threshold voltage for neurons to produce spikes, the plurality of intermediate neurons, and the plurality of output neurons.

14. The method of claim 12, wherein generating the plurality of intermediate neurons divided into the second plurality of groups further comprises determining a quantity of the plurality of intermediate neurons based on a maximum allowed fan-in width of the plurality of output neurons.

15. The method of claim 12, wherein generating the plurality of intermediate neurons divided into the second plurality of groups further comprises determining a quantity of the plurality of intermediate neurons based on a weight matrix associated with the plurality of intermediate neurons.

16. The method of claim 12, wherein generating the plurality of intermediate neurons divided into the second plurality of groups further comprises determining a quantity of the plurality of intermediate neurons based on a threshold range of a membrane voltage change after which a spike is generated in the plurality of output neurons.

17. The method of claim 12, wherein an output of the plurality of output neurons is proportional to a dot product of a fan-in weight of the plurality of output neurons and an input to the plurality of output neurons.

18. The method of claim 12, wherein an output of the plurality of output neurons is within a threshold of a dot product of a fan-in weight of the plurality of output neurons and an input to the plurality of output neurons.

* * * * *